US012615558B2

(12) United States Patent (10) Patent No.: US 12,615,558 B2

Fujishiro (45) Date of Patent: Apr. 28, 2026

(54) COMMUNICATION CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 477 days.

(21) Appl. No.: 18/160,975

(22) Filed: Jan. 27, 2023

(65) Prior Publication Data

US 2023/0180064 A1 Jun. 8, 2023

Related U.S. Application Data

(63) Continuation of application No. PCT/JP2021/027421, filed on Jul. 21, 2021.

(30) Foreign Application Priority Data

Jul. 28, 2020 (JP) ................................. 2020-127751

(51) Int. Cl.
 *H04W 76/20* (2018.01)
 *H04W 36/00* (2009.01)
(52) U.S. Cl.
 CPC ....... *H04W 36/0007* (2018.08); *H04W 76/20* (2018.02)
(58) Field of Classification Search
 CPC ... H04W 36/007; H04W 76/20; H04W 76/27; H04W 76/40; H04W 48/12; H04W 48/20
 See application file for complete search history.

(56) References Cited

U.S. PATENT DOCUMENTS

| 2007/0275742 | A1 | 11/2007 | Zhang |
| 2010/0067490 | A1* | 3/2010 | Chiu ................... H04L 12/1877 |
| | | | 370/389 |
| 2014/0161017 | A1 | 6/2014 | Lee et al. |
| 2016/0014572 | A1 | 1/2016 | Vetter et al. |
| 2018/0035340 | A1 | 2/2018 | Fujishiro et al. |
| 2018/0077660 | A1* | 3/2018 | Ly ....................... H04W 56/001 |
| 2019/0174271 | A1 | 6/2019 | Fujishiro et al. |
| 2020/0059835 | A1 | 2/2020 | Kim et al. |
| 2021/0337593 | A1 | 10/2021 | Fujishiro et al. |

FOREIGN PATENT DOCUMENTS

| JP | 2008-507930 A | 3/2008 |
| JP | 2017-528029 A | 9/2017 |
| JP | 2018-033165 A | 3/2018 |
| WO | 2018/030385 A1 | 2/2018 |
| WO | 2020/145000 A1 | 7/2020 |

* cited by examiner

*Primary Examiner* — Jamal Javaid

(74) *Attorney, Agent, or Firm* — Studebaker Brackett PLLC

(57) ABSTRACT

A communication control method is used in a mobile communication system for providing a multicast broadcast service (MBS) on a per zone basis, the zone being narrower than a cell. The communication control method includes broadcasting, by a base station configured to manage a first cell, in the first cell, system information including zone information indicating a zone where MBS transmission is to be performed in a second cell different from the first cell, receiving, by a user equipment located in the first cell, the system information, and performing, by the user equipment, a predetermined operation to receive MBS data within the zone based on the system information.

4 Claims, 14 Drawing Sheets

COMMUNICATION CONTROL METHOD

RELATED APPLICATIONS

The present application is a continuation based on PCT Application No. PCT/JP2021/027421, filed on Jul. 21, 2021, which claims the benefit of Japanese Patent Application No. 2020-127751 filed on Jul. 28, 2020. The content of which is incorporated by reference herein in their entirety.

TECHNICAL FIELD

The present disclosure relates to a communication control method used in a mobile communication system.

BACKGROUND OF INVENTION

PTL 1 describes a mobile communication system that provides a multicast broadcast service (hereinafter referred to as "MBS" as appropriate) on a per zone basis, the zone being narrower than a cell.

CITATION LIST

Patent Literature

PTL 1: WO 2018/030385A

SUMMARY

A first aspect provides a communication control method used in a mobile communication system for providing a multicast broadcast service (MBS) on a per zone basis, the zone being narrower than a cell, the communication control method including broadcasting, by a base station configured to manage a first cell, in the first cell, system information including zone information indicating a zone where MBS transmission is to be performed in a second cell different from the first cell, receiving, by a user equipment located in the first cell, the system information, and performing, by the user equipment, a predetermined operation to receive MBS data within the zone based on the system information.

A second aspect provides a communication control method used in a mobile communication system for providing a multicast broadcast service (MBS) on a per zone basis, the zone being narrower than a cell, the communication control method including when a user equipment in an RRC connected state in a cell receives MBS data transmitted to a zone within the cell, transmitting, by the user equipment, to a base station configured to manage the cell, a notification related to the MBS data, wherein the transmitting includes not transmitting the notification when the user equipment is located outside the zone and transmitting the notification when the user equipment is located within the zone.

A third aspect provides a communication control method used in a mobile communication system for providing a multicast broadcast service (MBS) on a per zone basis, the zone being narrower than a cell, the communication control method including transmitting, by a first base station configured to manage a first cell, to a second base station configured to manage a second cell, a handover request requesting handover of a user equipment in a connected state in the first cell, and determining, by the second base station, whether to accept the handover based on the handover request, wherein the handover request includes information indicating a zone where the user equipment receives MBS data or a zone where the user equipment is located.

A fourth aspect provides a communication control method used in a mobile communication system for providing a multicast broadcast service (MBS) on a per zone basis, the zone being narrower than a cell, the communication control method including receiving, by a base station configured to manage a cell, a notification indicating that a user equipment requests reception of MBS data, determining, by the base station, to initiate an MBS session of transmitting the MBS data in the cell based on the notification, and transmitting, by the base station, to a network node, an initiation request requesting initiation of the MBS session.

A fifth aspect provides a communication control method used in a mobile communication system for providing a multicast broadcast service (IBS) on a per zone basis, the zone being narrower than a cell, the communication control method including receiving, by a base station configured to manage a cell, an initiation notification indicating initiation of an MBS session of transmitting MBS data in the cell, from a network node, and transmitting, by the base station, the MBS data using the MBS session based on the initiation notification, wherein the initiation notification includes zone information indicating a zone to which the MBS session is applied, and the transmitting includes transmitting the MBS data for the zone indicated by the zone information.

DESCRIPTION OF EMBODIMENTS

The mobile communication system described in PTL 1 has room for improvement in allowing MBS provided on a per zone basis to be efficiently received.

The present disclosure allows MBS provided on a per zone basis to be efficiently received.

A mobile communication system according to an embodiment will be described with reference to the drawings. In the description of the drawings, the same or similar parts are denoted by the same or similar reference signs.

Mobile Communication System

Figure 1:
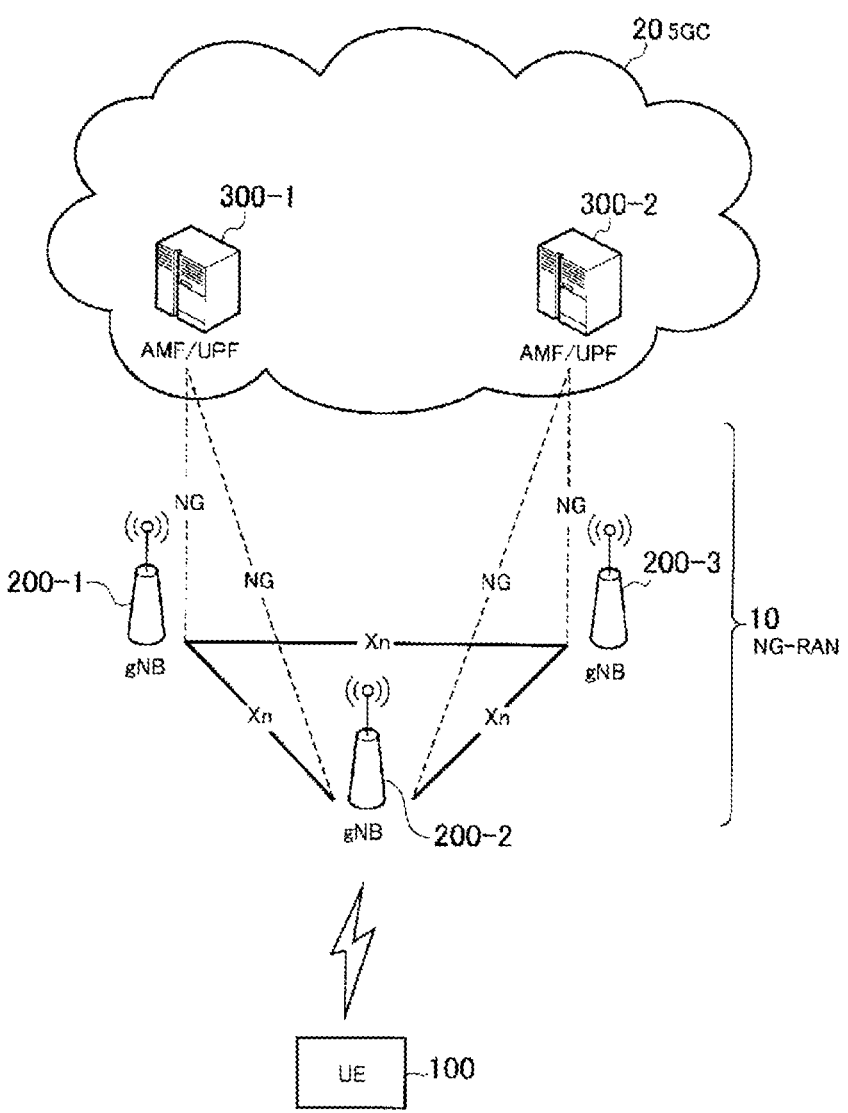
FIG. 1 is a diagram illustrating a configuration of a mobile communication system according to an embodiment.

First, a configuration of a mobile communication system according to an embodiment will be described. FIG. 1 is a diagram illustrating a configuration of the mobile communication system according to an embodiment. This mobile communication system complies with the 5th Generation System (5GS) of the 3GPP standard. The description below takes the 5GS as an example, but Long Term Evolution (LTE) system may be at least partially applied to the mobile communication system.

As illustrated in FIG. 1, the mobile communication system includes a user equipment (UE) 100, a 5G radio access network (next generation radio access network (NG-RAN)) 10, and a 5G core network (5GC) 20.

The UE 100 is a mobile wireless communication apparatus. The UE 100 may be any apparatus as long as utilized by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 are interconnected via an Xn interface, which is an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signalling. The UPF controls data transfer. The AMF and UPF are connected to the gNB 200 via an NG interface, which is an interface between a base station and the core network.

Figure 2:
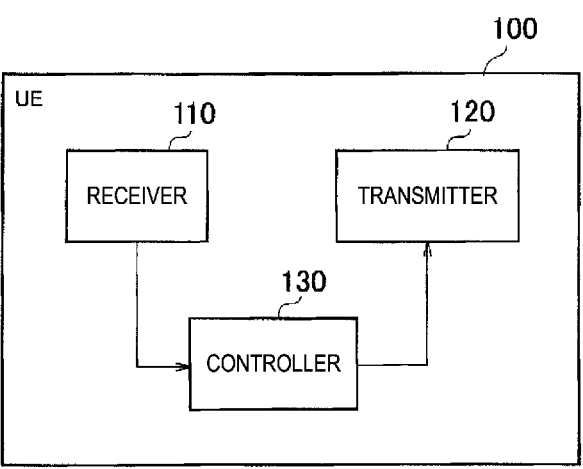
FIG. 2 is a diagram illustrating a configuration of a User Equipment (UE) according to the embodiments.

FIG. 2 is a diagram illustrating a configuration of the UE 100 (user equipment) according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of control in the UE 100. The controller 130 includes at least one processor and at least one memory. The memory stores a program to be executed by the processor and information to be used for processing by the processor. The processor may include a baseband processor and a central processing unit (CPU). The baseband processor performs modulation and demodulation, coding and decoding, and the like of a baseband signal. The CPU executes the program stored in the memory to thereby perform various types of processing.

Figure 3:
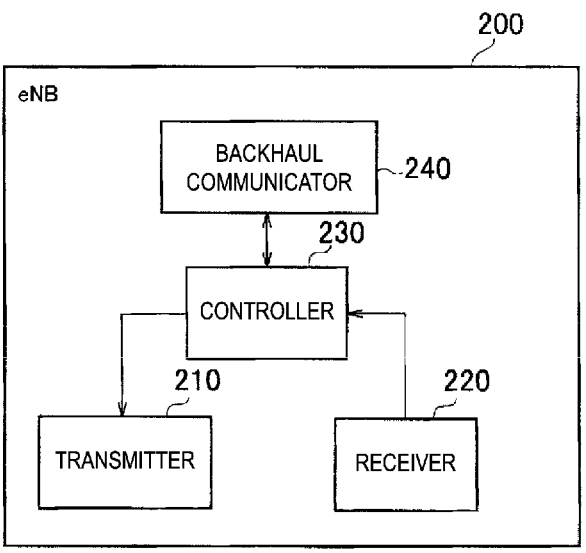
FIG. 3 is a diagram illustrating a configuration of a base station (gNB) according to the embodiments.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
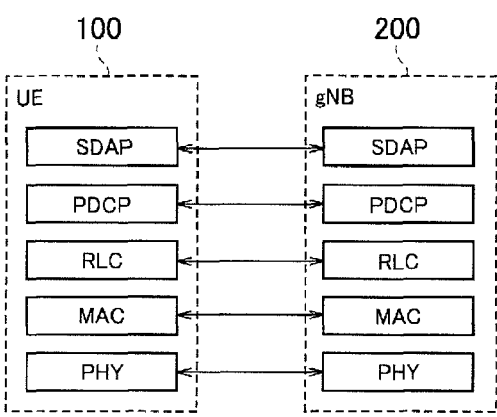
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs preferential control of data, retransmission processing using a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of QoS control by a core network and a radio bearer as the unit of QoS control by an access stratum (AS). Note that, when the RAN is connected to the EPC, the SDAP may not be provided.

Figure 5:
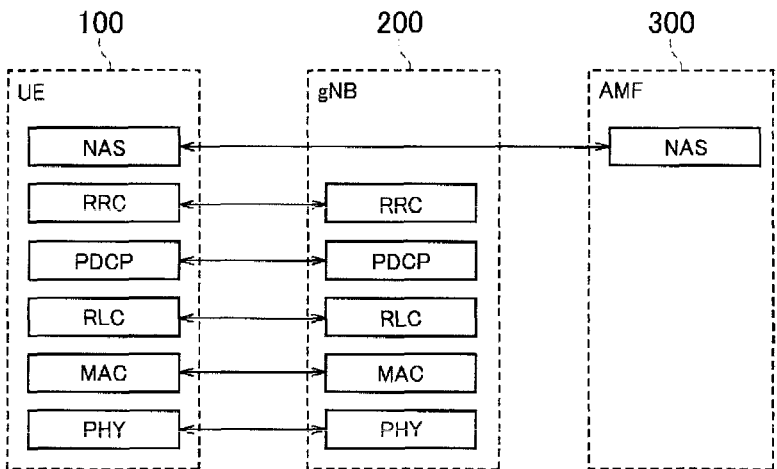
FIG. 5 is a diagram illustrating a configuration of a protocol stack of a radio interface of a control plane handling signalling (control signal).

FIG. 5 is a diagram illustrating a configuration of a protocol stack of a radio interface of a control plane handling signalling (control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signalling for various configurations is transmitted between the RRC layer of the UE 100 and the RRC layer of the gNB 200. The RRC layer controls a logical channel, a transport channel, and a physical channel according to establishment, reestablishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is higher than the RRC layer performs session management, mobility management, and the like. NAS signalling is transmitted between the NAS layer of the UE 100 and the NAS layer of the AMF 300.

Note that the UE 100 includes an application layer other than the protocol of the radio interface.

MBS

An MBS according to an embodiment will be described. The MBS is a service in which the NG-RAN 10 provides broadcast or multicast, that is, point-to-multipoint (PTM) data transmission to the UE 100. The MBS may be referred to as the Multimedia Broadcast and Multicast Service (MBMS).

Use cases of the MBS include public communication, mission critical communication, V2X (Vehicle to Everything) communication, IPv4 or IPv6 multicast delivery, IPTV, group communication, and software delivery.

Figure 6:
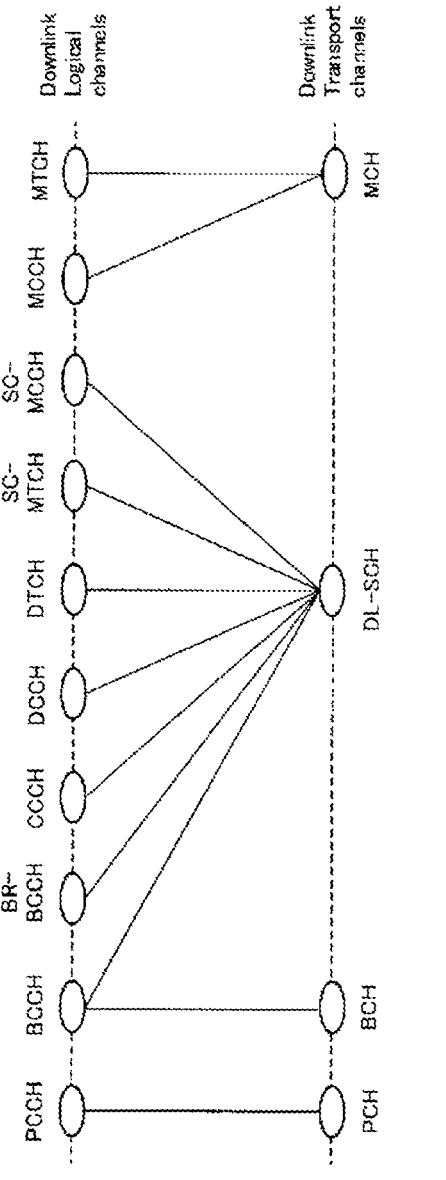
FIG. 6 is a diagram illustrating a correspondence relationship between a downlink Logical channel and a downlink Transport channel according to an embodiment.

MBS Transmission in LTE includes two schemes, i.e., a Multicast Broadcast Single Frequency Network (MBSFN) transmission and Single Cell Point-To-Multipoint (SC-PTM) transmission. FIG. 6 is a diagram illustrating a correspondence relationship between a downlink Logical channel and a downlink Transport channel according to an embodiment.

As illustrated in FIG. 6, the logical channels used for MBSFN transmission are a Multicast Traffic Channel (MTCH) and a Multicast Control Channel (MCCH), and the transport channel used for MBSFN transmission is a Multicast Control Channel (MCH). The MBSFN transmission is designed primarily for multi-cell transmission, and in an MBSFN area including a plurality of cells, each cell synchronously transmits the same signal (the same data) in the same MBSFN subframe.

The logical channels used for SC-PTM transmission are a Single Cell Multicast Traffic Channel (SC-MTCH) and a Single Cell Multicast Control Channel (SC-MCCH), and the transport channel used for SC-PTM transmission is a Downlink Shared Channel (DL-SCH). The SC-PTM transmission is primarily designed for single-cell transmission, and corresponds to broadcast or multicast data transmission on a cell-by-cell basis. The physical channels used for SC-PTM transmission are a Physical Downlink Control Channel (PDCCH) and a Physical Downlink Shared Channel (PDSCH), and enables dynamic resource allocation. Although an example will be mainly described below in which the MBS is provided using the SC-PTM transmission scheme, the MBS may be provided using the MBSFN transmission scheme.

A mobile communication system according to an embodiment provides an MBS on a per zone basis, the zone being narrower than a cell. The zone refers to a geographic small area defined separately from the cell. The UE 100 is assumed to be able to identify the position of the UE 100 and the corresponding zone by position information obtained using a Global Navigation Satellite System (GNSS) receiver, for example.

Figure 7:
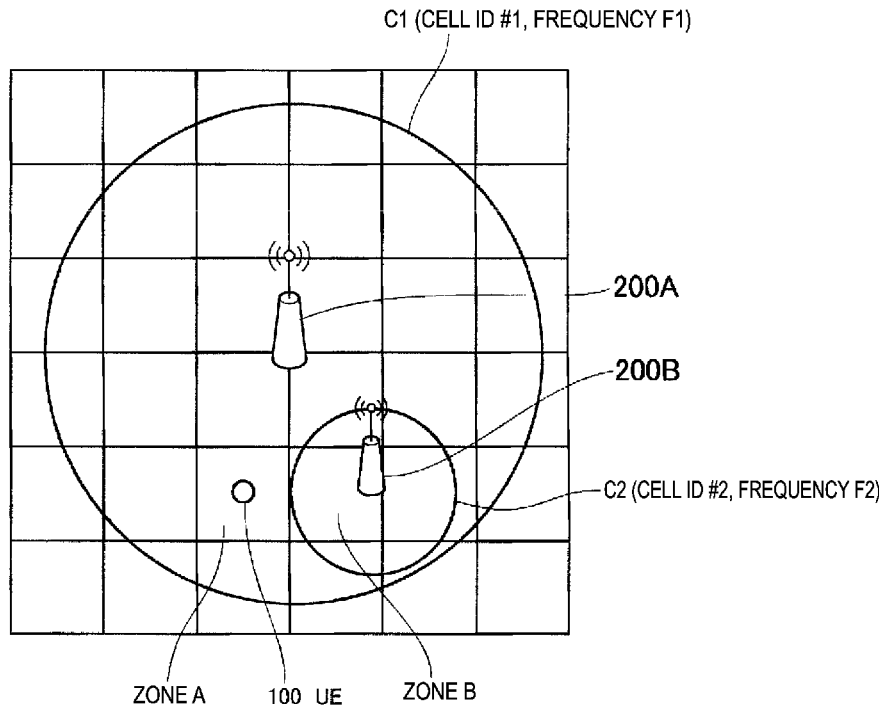
FIG. 7 is a diagram illustrating a configuration example of a zone in a mobile communication system according to an embodiment.

FIG. 7 is a diagram illustrating a configuration example of a zone in the mobile communication system according to an embodiment. Each rectangular region in FIG. 7 is a zone. Although an example will be mainly described below in which each zone is a rectangular geographical region, the zone may be a circular or an elliptical geographical region instead of the rectangular graphical region. The zone may be referred to as a small region, a small area, a sub-region, or a sub-area.

Each zone may be represented by a rectangular coordinate system (x, y). For example, the zone may include information indicating the length of the zone (Length), the width of the zone (width), and a reference point. The reference point refers to one vertex of the rectangle (e.g., an upper left vertex), and the reference point is represented based on a point on the earth. Each zone may be represented by the latitude and longitude of two diagonal vertices (for example, the latitude and longitude of a northeast point and the latitude and longitude of a southwest point) among the four vertices of the rectangular zone. Each zone may be represented by a polar coordinate system (r, θ). The information representing the zone is referred to as "zone information."

FIG. 7 illustrates a gNB 200A managing a cell C1 and a gNB 200B managing a cell C2. The cell C2 is narrower than the cell C1 and is contained in the geographic area of the cell C1. Note that, the cell C1 and the cell C2 may be managed by one gNB 200. The cell C1 is operated at a frequency F1, and the cell C2 is operated at a frequency F2. That is, the cell C1 and the cell C2 are operated at different frequencies. Note that, the cell C1 and the cell C2 may be operated at the same frequency.

Each of the gNB 200A and the gNB 200B performs MBS transmission on a per zone basis, the zone belonging to the own cell. The MBS transmission refers to at least one of multicast transmission and broadcast transmission, but in an example mainly described below, the MBS transmission is multicast transmission. Data transmitted by the MBS transmission may be referred to as MBS data.

Each of the gNBs 200 (gNB 200A and gNB 200B) transmits zone-specific data for each zone. Specifically, different MBS sessions are assigned to respective zones, and each gNB 200 transmits zone-specific data by using the MBS session. The MBS session is identified by at least one selected from the group consisting of a Temporary Mobile Group Identity (TMGI), a session identifier, and a Group Cell Radio Network Temporary Identifier (G-RNTI). At least one of these identifiers is hereinafter referred to as an MBS session identifier.

The zone-based MBS transmission, in which zone-specific data is transmitted on a per zone basis, can provide a fine-tuned service compared to cell-based MBS transmission. For example, in an assumption of V2X, the zone-unit MBS transmission can provide a service of transmitting traffic related data for an intersection to each UE 100 located in a zone to which the intersection belongs.

In FIG. 7, the UE 100 is located in a zone A of the cell C1. The UE 100 may move toward a zone B. In the zone A, the UE 100 may receive data to be multicast for the zone A. The same data may be multicast in the zone A and in the zone B.

In moving from the zone A to the zone B, the UE 100 moves to the cell C2. In this case, cell reselection or handover from the cell A to the cell B may need to be performed. The cell reselection is a cell switching operation performed by the UE 100 in the RRC idle state or the RRC inactive state. The handover is a cell switching operation performed by the UE 100 in the RRC connected state. Each of the embodiments below primarily assumes the scenario as described above. Note that PTL 1 (WO 2018/030385) describes the basic operation of providing an MBS on a per zone basis.

First Embodiment

Given the mobile communication system and multicast broadcast service (MBS) described above, operations according to a first embodiment will be described.

According to the first embodiment, a communication control method is a method used in a mobile communication system that provides an MBS on a per zone basis, the zone being narrower than a cell. The communication control method according to the first embodiment includes, as illustrated in FIG. 7, the steps of broadcasting in the cell C1, by the gNB 200A managing the cell C1, system information including zone information indicating a zone where MBS transmission is performed in the cell C2 different from the cell C1, receiving the system information by the UE 100 located in the cell C1, and performing, by the UE 100, a predetermined operation to receive MBS data within the zone based on the system information. This allows UE 100 to efficiently receive the MBS data in the zone of the cell C2 based on the system information received in the cell CL.

The system information may be referred to as a system information block. The system information may be system information for the MBS. Such system information is hereinafter referred to as "MBS system information." The MBS system information further includes an identifier associated with the zone information. The identifier is at least one selected from the group consisting of an identifier indicating the cell C2 (cell identifier), an identifier indicating the frequency to which the cell C2 belongs (frequency identifier), and an identifier indicating an MBS session used for the MBS transmission in the zone (MBS session identifier).

For example, the MBS system information may include the cell identifier of at least one neighbor cell and zone information associated with each cell identifier. The MBS system information may include the frequency identifier of at least one neighbor frequency and zone information associated with each frequency identifier. The neighbor frequency refers to a frequency different from a serving frequency. The MBS system information may include at least one MBS session identifier and zone information associated with each session identifier.

(1) Operation Example 1 of First Embodiment

In Operation Example 1 of the first embodiment, the step of performing the predetermined operation to receive the MBS data within the zone of the cell C2 includes performing, by the UE 100 in the RRC idle state or the RRC inactive state, an operation of the cell reselection from the cell C1 to the cell C2. This step includes configuring the cell 2 or the frequency to which the cell C2 belongs with the highest priority of the cell reselection when the UE 100 moves to a zone of the cell C2 and receives the MBS data transmitted to the zone.

Figure 8:
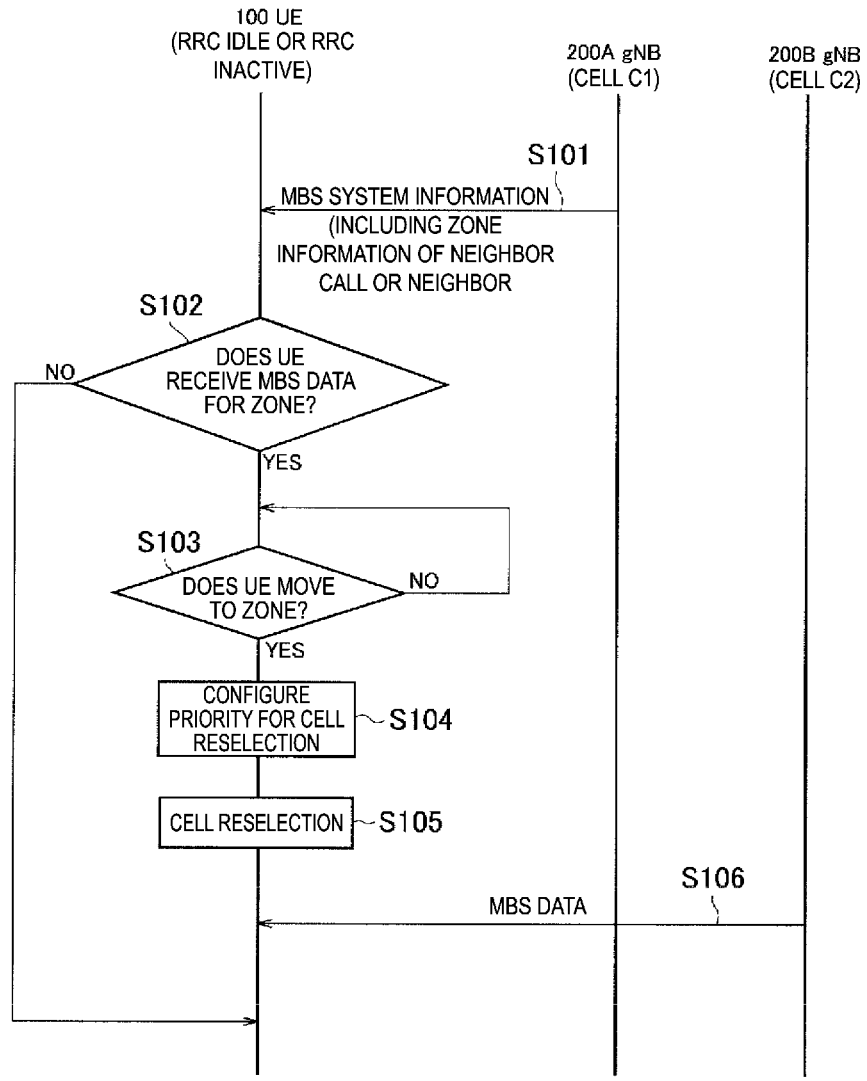
FIG. 8 is a diagram illustrating Operation Example 1 of a first embodiment.

FIG. 8 is a diagram illustrating Operation Example 1 of the first embodiment. Operation Example 1 assumes that the UE 100 is in the RRC idle state or the RRC inactive state.

As illustrated in FIG. 8, in step S101, the gNB 200A broadcasts MBS system information including the zone information of the cell C2 being a neighbor cell (or the frequency F2 being a neighbor frequency). The UE 100 located in the cell C1 receives the MBS system information from the gNB 200A.

In step S102, the UE 100 determines whether to receive the MBS data transmitted to the zone indicated by the zone information included in the MBS system information received in step S101 (i.e., the MBS data for the zone). Here, the UE 100 may identify the MBS data transmitted to the zone based on the MBS session identifier included in the MBS system information. Note that "receiving the MBS data" is not limited to the actual, ongoing reception of the MBS data, but also includes a state that a user or application is requesting the reception of the MBS data (i.e., a state that a user or application is interested in the reception of the MBS data). When the UE 100 does not receive the MBS data transmitted to the zone (step S102: No), the present operation ends.

When the UE 100 receives the MBS data transmitted to the zone (step S102: Yes), then in step S103, the UE 100 determines whether the UE 100 has moved to the zone (the zone indicated by the zone information included in the MBS system information received in step S101).

When the UE 100 has moved to the zone (step S103: Yes), then in step S104, the UE 100 configures the cell C2 or the frequency to which the cell C2 belongs with the highest priority of the cell reselection based on the cell identifier or frequency identifier included in the MBS system information received in step S101. In other words, the UE 100 controls the cell reselection so as to preferentially perform the cell reselection from a cell C1 to a cell C2.

In step S105, the UE 100 performs cell reselection from the cell C1 to the cell C2.

In step S106, the UE 100 receives the MBS data transmitted for the zone by gNB 200B (cell C2) based on the MBS session identifier included in the MBS system information received in step S101. The UE 100 may receive the MBS data after transitioning to the RRC connected state.

Thus, according to Operation Example 1 of the first embodiment, the UE 100 in the RRC idle state or the RRC inactive state can efficiently receive the MBS data.

(2) Operation Example 2 of First Embodiment

Operation Example 2 of the first embodiment will be described focusing on differences from Operation Example 1 of the first embodiment. In Operation Example 2 of the first embodiment, the step of performing the predetermined operation includes performing, by the UE 100 in the connected state, an operation for switching the connection from the cell C1 to the cell C2 based on the MBS system information. This step includes transmitting, by the UE 100, a notification to the gNB 200A when the UE 100 moves to a zone of the cell C2 and receives the MBS data transmitted to the zone of the cell C2.

Figure 9:
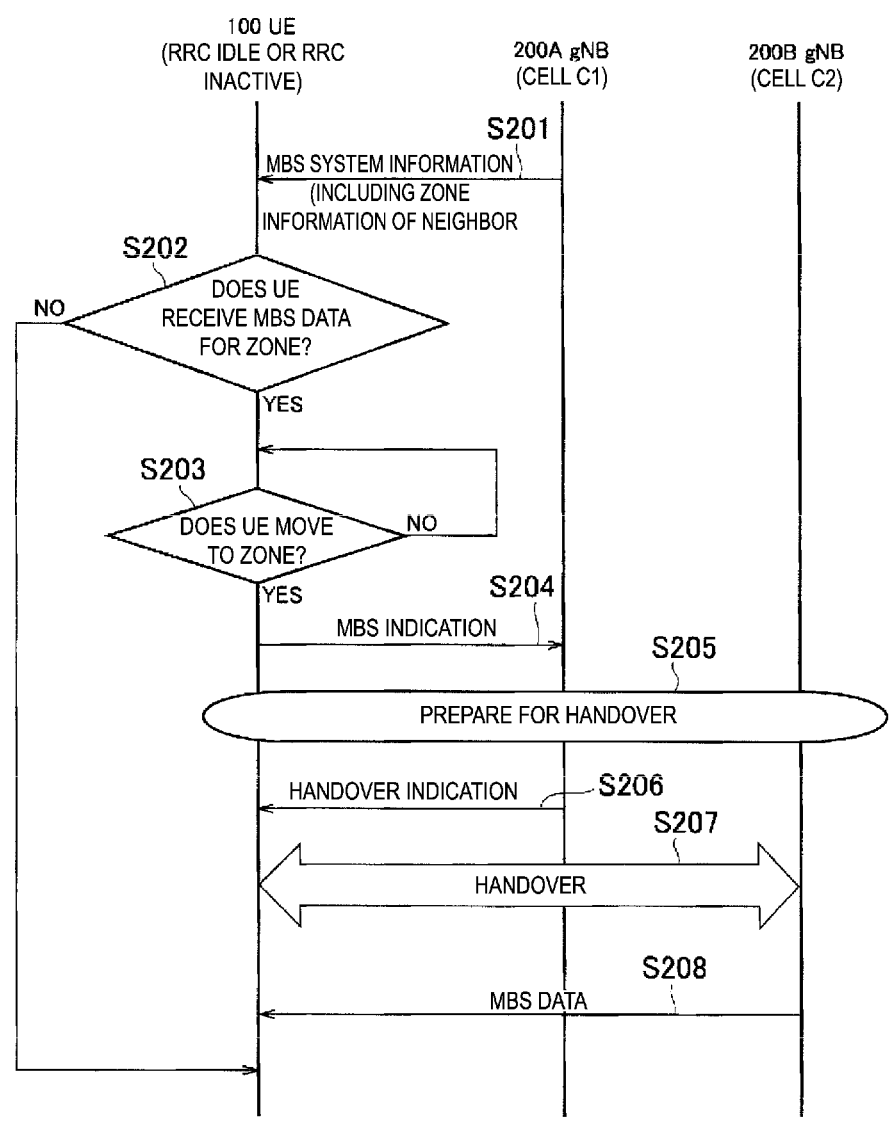
FIG. 9 is a diagram illustrating Operation Example 2 of the first embodiment.

FIG. 9 is a diagram illustrating Operation Example 2 of the first embodiment. Operation Example 2 assumes that the UE 100 is in the RRC idle state or the RRC inactive state.

As illustrated in FIG. 9, in step S201, the gNB 200A broadcasts the MBS system information including the zone information of the cell C2 being a neighbor cell (or the frequency F2 being a neighbor frequency). The UE 100 located in the cell C1 receives the MBS system information from the gNB 200A.

In step S202, the UE 100 determines whether to receive the MBS data transmitted to the zone indicated by the zone information included in the MBS system information received in step S201 (i.e., the MBS data for the zone). When the UE 100 does not receive the MBS data transmitted to the zone (step S202: No), the present operation ends.

When the UE 100 receives the MBS data transmitted to the zone (step S202: Yes), then in step S203, the UE 100 determines whether the UE 100 has moved to the zone (the zone indicated by the zone information included in the MBS system information received in step S201).

When the UE 100 has moved to the zone (step S203: Yes), the UE 100 transmits a notification to the gNB 200A in step S204. Such a notification is hereinafter referred to as an MBS indication. The notification is an indication that notifies the interest of the UE 100 with respect to the MBS, and may be referred to as MBS interest indication. Note that the gNB 200A may provide in advance configuration for the UE 100 whether to cause the UE 100 to perform the notification as described above.

The MBS indication may include at least one of information elements including the zone information of the zone corresponding to the MBS data (MBS session) that the UE 100 takes interest in receiving, the zone information of the zone where the UE 100 is currently located in, the MBS session identifier of the MBS session that the UE 100 takes interest in receiving, and GNSS position information (latitude and longitude) of the current position of the UE 100. These information elements may be based on the MBS system information.

Note that the UE 100 may be able to transmit an MBS indication related to multicast associated with the zone only when the UE 100 is in the zone. The UE 100 may not transmit an MBS indication with the same content (e.g., an MBS indication with the same session identifier in which the UE 100 takes interest) within the same zone. The UE 100 may transmit the MBS indication when the zone to which the UE 100 belongs is changed.

In step S205, a handover preparation operation is performed. The handover preparation operation includes at least one selected from the group consisting of an operation in which the gNB 200A provides configuration for causing the UE 100 to perform measurement for the frequency F2, an operation in which the UE 100 reports measurement results for the frequency F2 to the gNB 200A, an operation in which the gNB 200A transmits a handover request to the gNB 200B, and an operation in which the gNB 200B transmits a handover response to the gNB 200A.

In step S206, the gNB 200A transmits, to the UE 100, a handover indication indicating handover to the cell C2. The UE 100 receives the handover indication.

In step S207, in response to receiving the handover indication, the UE 100 performs handover from the cell C1 to the cell C2.

In step S208, the UE 100 receives the MBS data transmitted by the gNB 200B (cell C2) for the zone based on the MBS session identifier included in the MBS system information received in step S201.

Thus, according to Operation Example 2 of the first embodiment, the UE 100 in the RRC connected state can efficiently receive the MBS data.

Second Embodiment

Operations according to a second embodiment will be described focusing on differences from the above-described embodiment.

According to the second embodiment, a communication control method is a method used in a mobile communication system that provides an MBS on a per zone basis, the zone being narrower than a cell. According to the second embodiment, the communication control method includes the step of transmitting, from the UE 100 in the RRC connected state in a cell, a notification related to MBS data transmitted to a zone within the cell, to the gNB 200 managing the cell when the UE 100 receives the MBS data. The step of transmitting includes transmitting the notification when the UE 100 is located within the zone, while not transmitting the notification when the UE 100 is located outside of the zone. The notification is the above-described MBS indication, an MBS counting response, or feedback information.

On the assumption that the MBS is provided on a per zone basis, the zone being narrower than the cell, transmitting a notification related to the MBS data at a position outside the zone in which the UE 100 receives the MBS data is inefficient. Accordingly, in the second embodiment, the UE 100 transmits, to the gNB 200, the notification related to the MBS data only when the UE 100 is located within the zone in which the UE 100 receives the MBS data.

(1) Operation Example 1 of Second Embodiment

Operation Example 1 of the second embodiment further includes the step of receiving, at the UE 100 from the gNB 200, a counting request including an identifier (MBS session identifier) indicating a target MBS session. The step of transmitting the notification includes transmitting a counting response as a notification when the UE 100 receives the MBS data of the target MBS session within the zone.

Thus, Operation Example 1 of the second embodiment is an operation example assuming the MBS counting. The MBS counting is an operation in which the network side recognizes the number of UEs 100 that receive the MBS data of an MBS session to efficiently provide the MBS. The MBS session is associated with the zone, and thus the MBS data of the MBS session is not receivable outside this zone. Accordingly, only the UEs 100 located within the zone transmit the counting response for the MBS session.

Figure 10:
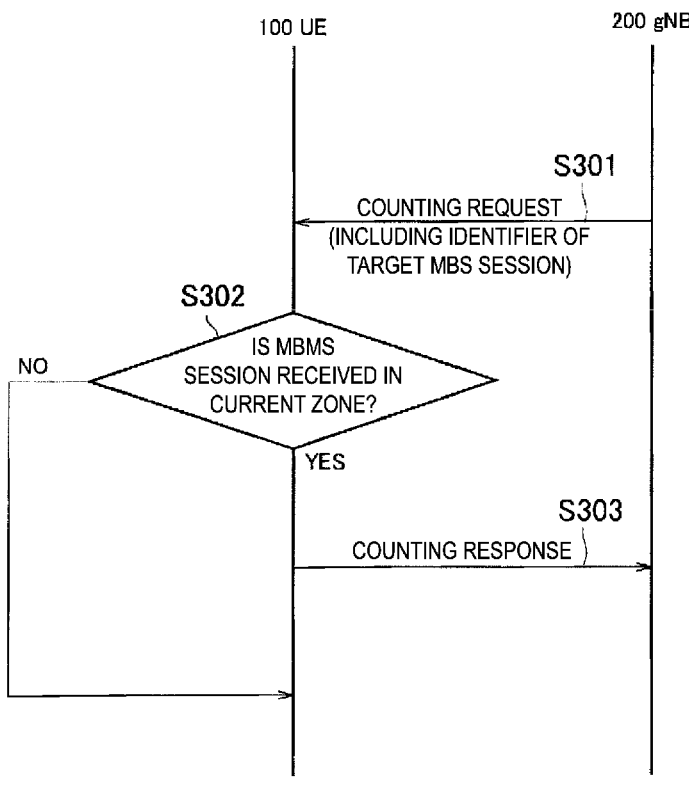
FIG. 10 is a diagram illustrating Operation Example 1 of a second embodiment.

FIG. 10 is a diagram illustrating Operation Example 1 of the second embodiment.

As illustrated in FIG. 10, in step S301, the gNB 200 transmits the counting request to the UE 100. The counting request includes at least one MBS session identifier of the target MBS session. The counting request may include zone information of the zone corresponding to the target MBS session. The UE 100 receives the counting request.

In step S302, the UE 100 determines whether the UE 100 is located in the zone corresponding to the MBS session identifier included in the counting request and whether the UE 100 receives the MBS data of the MBS session identifier. As described above, "receiving MBS data" refers to being in the process of receiving MBS data or taking interest in receiving MBS data.

In the case of "No" in step S302, the present operation ends. On the other hand, in the case of "Yes" in step S302, then in step S303, the UE 100 transmits, to the gNB 200, a counting response indicating the MBS session in which the UE 100 receives the MBS data.

(2) Operation Example 2 of Second Embodiment

In Operation Example 2 of the second embodiment, the notification transmitted by the UE 100 is a feedback signal for the MBS data received by the UE 100 within the zone. The feedback signal includes at least one of ACK and NACK. The feedback signal may be Channel State Information (CSI).

Figure 11:
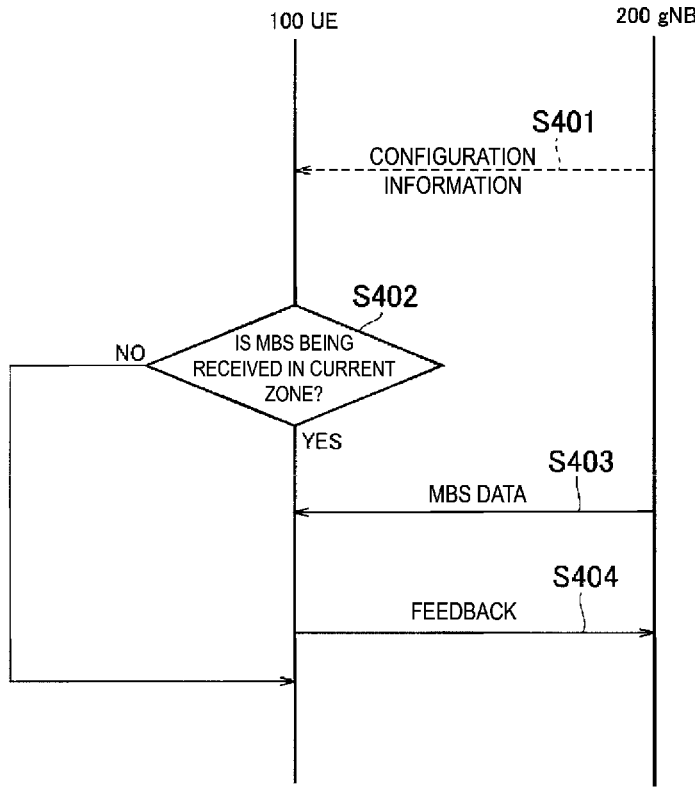
FIG. 11 is a diagram illustrating Operation Example 2 of the second embodiment.

FIG. 11 is a diagram illustrating Operation Example 2 of the second embodiment.

As illustrated in FIG. 11, in step S401, the gNB 200 transmits, to the UE 100, the RRC message including configuration information related to the feedback signal. Note that, step S401 is optional. The configuration information includes information indicating that feedback transmission is allowed only when the UE 100 is in the zone where the UE 100 receives the MBS data, information indicating that feedback transmission is allowed only when the UE 100 is in the zone and in the neighbor zone, information indicating that feedback transmission is allowed regardless of the zone, or information indicating that feedback transmission is not allowed.

In step S402, the UE 100 determines whether the UE 100 is located in the zone corresponding to the MBS session identifier of the MBS session at which reception receives the MBS data. In the case of "No" in step S402, the present operation ends.

In the case of "Yes" in step S402, then in the step S403, the UE 100 receives the MBS data from the gNB 200.

In step S404, the UE 100 transmits the feedback signal to the gNB 200. The feedback signal may be at least one of ACK/NACK feedback of HARQ of the MAC layer and ACK/NACK feedback of ARQ of the RLC layer. The ACK/NACK feedback of the HARQ may be the feedback of only the NACK. The gNB 200 performs, based on the feedback signal received from the UE 100, retransmission processing, switching to (from) unicast, adjustment for the MCS, or the like.

Third Embodiment

Operations according to a third embodiment will be described focusing on differences from the above-described embodiments.

According to the third embodiment, a communication control method is a method used in a mobile communication system that provides an MBS on a per zone basis, the zone being narrower than a cell. According to the third embodiment, the communication control method includes, as illustrated in FIG. 7, the steps of transmitting, from the gNB

200A managing the cell C1 to the gNB 200B managing the cell C2, a handover request requesting handover of the UE 100 in the connected state in the cell C1, and determining, by the gNB 200B, whether to accept the handover based on the handover request. The handover request includes information indicating the zone where the UE 100 receives the MBS data or the zone where the UE 100 is located.

Figure 12:
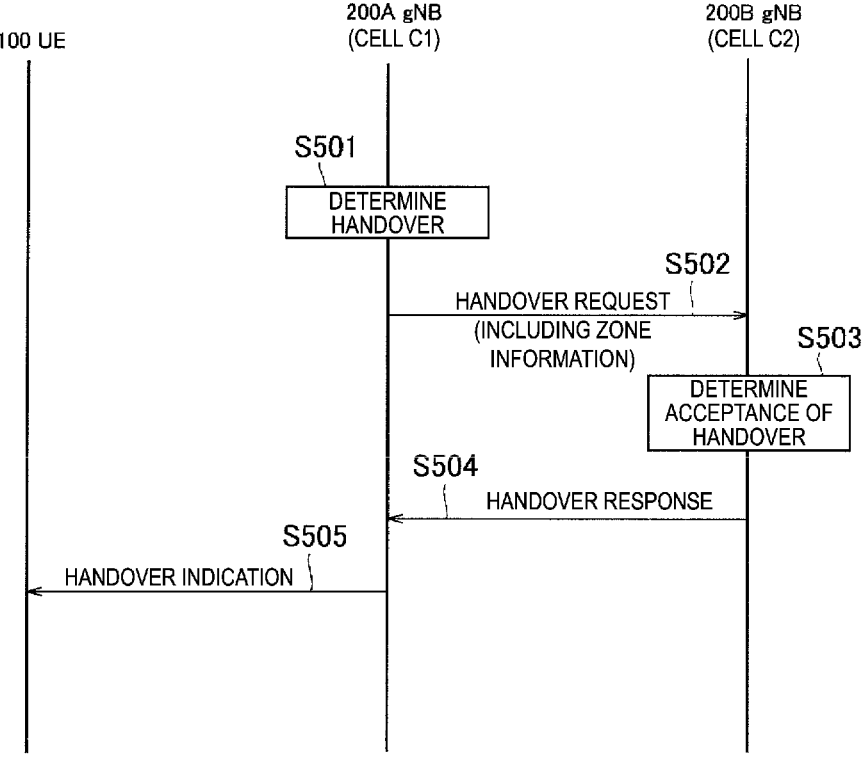
FIG. 12 is a diagram illustrating operations according to a third embodiment.

FIG. 12 is a diagram illustrating operations according to the third embodiment. The operations illustrated in FIG. 12 may correspond to steps S205 and S206 illustrated in FIG. 9.

As illustrated in FIG. 12, in step S501, the gNB 200A determines to hand over the UE 100 from the cell C1 to the cell C2. Here, the gNB 200A is assumed to recognize the zone information of the zone where the UE 100 receives the MBS data or the zone where the UE 100 is currently located.

In step S502, the gNB 200A transmits, to the gNB 200B via the Xn interface or the NG interface, the handover request requesting acceptance of handover of the UE 100. Here, the gNB 200A includes, in the handover request, the zone information of the zone where the UE 100 receives the MBS data or the zone where the UE 100 is currently located. The gNB 200B receives the handover request.

In step S503, the gNB 200B determines whether to accept the handover based on the handover request. The gNB 200B may determine to reject acceptance of the handover when the cell C2 does not include the zone indicated by the zone information included in the handover request.

In step S504, the gNB 200B transmits, to the gNB 200A via the Xn interface or the NG interface, a handover response indicating the result of determination of whether to accept the handover. The gNB 200A receives the handover response.

When the handover response indicates acceptance of the handover, in step S505, the gNB 200A transmits, to the UE 100, a handover indication indicating the handover to the cell C2.

In response to determining to reject acceptance in step S503, then in step S504, the gNB 200B may include, in the handover response, at least one selected from the group consisting of an identifier indicating a cell including the zone indicated by the zone information included in the handover request, an identifier of the gNB 200 managing the cell, and an identifier of the frequency to which the cell belongs. Based on the identifier included in the handover response, the gNB 200A configures for the UE 100 the measurement of the neighbor frequency or determines another cell (another gNB 200) for handover.

Fourth Embodiment

Operations according to a fourth embodiment will be described focusing on differences from the above-described embodiments.

According to the fourth embodiment, a communication control method includes the steps of receiving, at the gNB 200 managing the cell, a notification indicating that the UE 100 requests the reception of IBS data, determining, by the gNB 200, to initiate an MBS session of transmitting the MBS data in the cell based on the notification, and transmitting, from the gNB 200 to a network node, an initiation request requesting the initiation of the MBS session. Thus, in the fourth embodiment, the gNB 200 can activate the initiation of the MBS session. Note that the communication control method according to the fourth embodiment can also be used in a mobile communication system configured to provide an MBS on a cell-by-cell basis.

Figure 13:
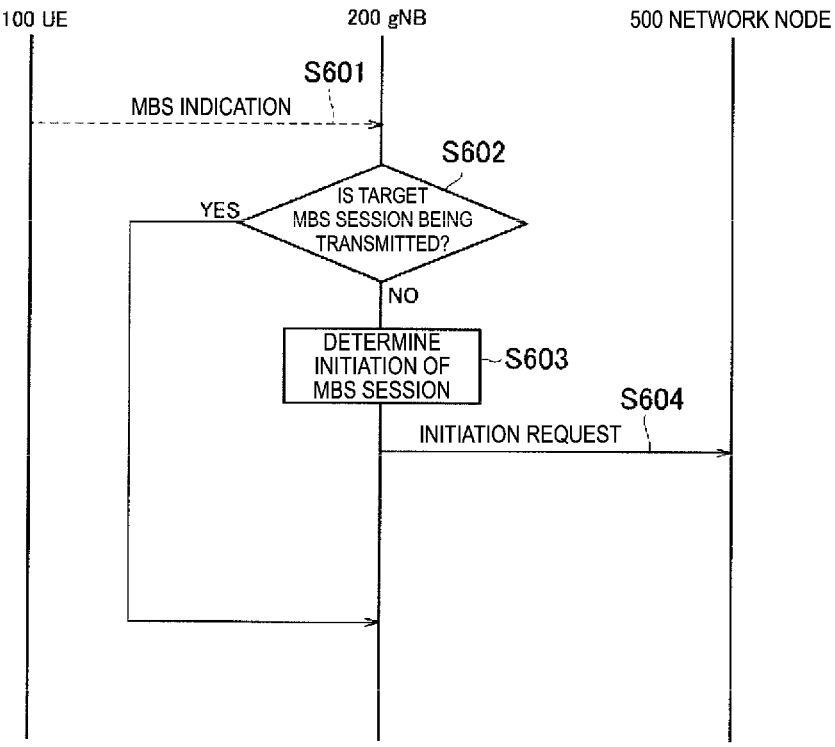
FIG. 13 is a diagram illustrating operations according to a fourth embodiment.

FIG. 13 is a diagram illustrating operations according to the fourth embodiment.

As illustrated in FIG. 13, in step S601, the gNB 200 receives the MBS indication described above from the UE 100. Alternatively, the gNB 200 may receive the handover request described above from another gNB 200. The MBS indication or the handover request may include at least one of the zone information of the zone where the UE 100 receives the MBS data and the MBS session identifier of the MBS session in which the UE 100 receives the MBS data.

In step S602, the gNB 200 determines whether the gNB 200 includes a target MBS session indicated by the MBS indication or the handover request (i.e., whether the gNB 200 is transmitting the MBS data of the target MBS session). When the gNB 200 includes the target MBS session (step S602: Yes), the present operation ends.

On the other hand, when the gNB 200 does not include the target MBS session (step S602: No), then in step S603, the gNB 200 determines to initiate the target MBS session. In step S604, the gNB 200 may determine to initiate the target MBS session only when the number of UEs 100 receiving the target MBS session exceeds a certain number. On the other hand, in a case that the number of the UEs 100 is small (e.g., 1 or 2), the gNB 200 may determine to provide the service by unicast.

In step S604, the gNB 200 transmits an initiation request of the target MBS session to the network node 500. The network node 500 may be present in a core network and may be an AMF, an SMF, or a UPF, for example. The gNB 200 may include, in the initiation request, the MBS session identifier of the target MBS session. Upon receiving the initiation request, the network node 500 prepares for the requested MBS session, and establishes an MBS session with the gNB 200.

Fifth Embodiment

Operation according to a fifth embodiment will be described focusing on differences from the above-described embodiments.

According to the fifth embodiment, a communication control method is a method used in a mobile communication system that provides an MBS on a per zone basis, the zone being narrower than a cell. According to the fifth embodiment, the communication control method includes the steps of receiving, at the gNB 200 managing the cell, an initiation notification indicating the initiation of an MBS session of transmitting MBS data in the cell, from the network node 500, and transmitting, by the gNB 200, the MBS data by using the MBS session based on the initiation notification. The initiation notification includes zone information indicating the zone to which the MBS session is applied. The step of transmitting the MBS data includes transmitting the MBS data to the zone indicated by the zone information included in the initiation notification.

Figure 14:
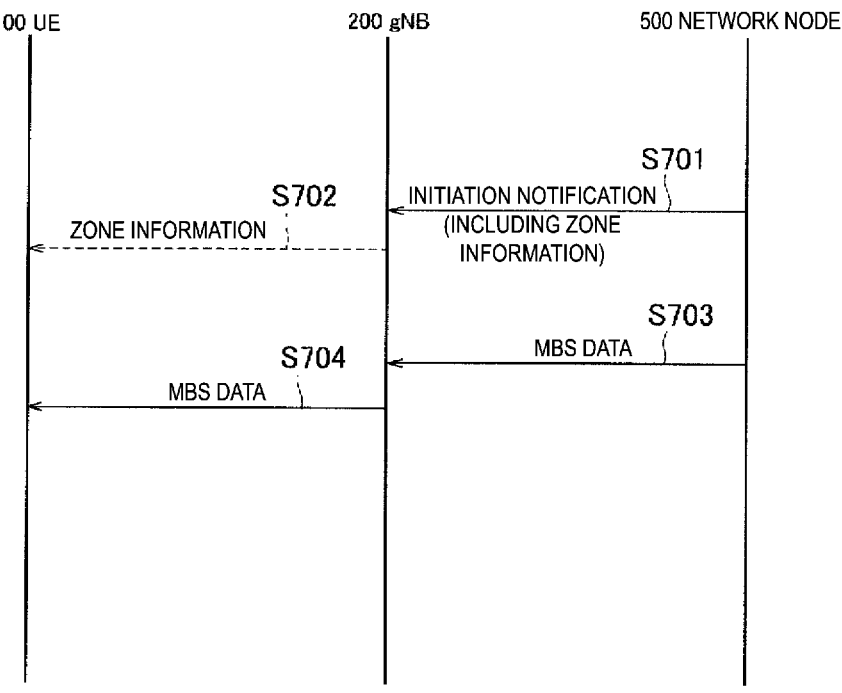
FIG. 14 is a diagram illustrating operations according to a fifth embodiment.

FIG. 14 is a diagram illustrating operations according to the fifth embodiment. The operations according to the fifth embodiment may be performed after the operations according to the fourth embodiment.

As illustrated in FIG. 14, in step S701, the gNB 200 receives the initiation notification for the target MBS session from the network node 500. Here, an entity of a service layer may configure, for the network node 500, an MBS configuration including a zone configuration in advance. The initiation notification includes the MBS session identifier of the target MBS session, and zone information associated with the MBS session identifier. The gNB 200 receives the initiation notification.

In step S702, the gNB 200 may transmit, to the UE 100, the zone information included in the initiation notification (or a set of the MBS session identifier and the zone information). Note that, step S702 is optional.

In step S703, the gNB 200 receives the MBS data of the target MBS session from the network node 500.

In step S704, the gNB 200 transmits the MBS data of the target MBS session to the UE 100.

Other Embodiments

The embodiments described above can not only be separately and independently implemented, but can also be implemented in combination of two or more of the embodiments.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design variations can be made without departing from the gist of the present disclosure.

The invention claimed is:

1. A communication control method used in a mobile communication system for providing a multicast broadcast service (MBS) on a per zone basis, the zone being narrower than a cell, the communication control method comprising:
   broadcasting, by a base station configured to manage a first cell, in the first cell, system information comprising zone information indicating a zone where MBS transmission is to be performed in a second cell different from the first cell;
   receiving, by a user equipment located in the first cell, the system information; and
   performing, by the user equipment, a predetermined operation to receive MBS data within the zone based on the system information,
   wherein
   the system information further comprises an identifier associated with the zone information, and
   the identifier corresponds to at least one selected from the group consisting of an identifier indicating the second cell, an identifier indicating a frequency to which the second cell belongs, and an identifier indicating an MBS session used for the MBS transmission to the zone.

2. The communication control method according to claim 1, wherein
   the performing the predetermined operation comprises performing, by the user equipment in a Radio Resource Control (RRC) idle state or an RRC inactive state, an operation of cell reselection from the first cell to the second cell, and the performing the operation of the cell reselection comprises configuring the second cell or a frequency to which the second cell belongs to be a highest priority in the cell reselection when the user equipment moves to the zone and receives the MBS data transmitted to the zone.

3. The communication control method according to claim 1, wherein the performing the predetermined operation comprises performing, by the user equipment in a connected state, an operation to switch connection from the first cell to the second cell based on the system information, and the performing the operation to switch connection comprises transmitting, by the user equipment, a notification to the base station when the user equipment moves to the zone and receives the MBS data transmitted to the zone.

4. A user equipment used in a mobile communication system for providing a multicast broadcast service (MBS) on a per zone basis, the zone being narrower than a cell, the user equipment comprising:

a receiver configured to receive from a base station configured to manage a first cell, in the first cell, system information comprising zone information indicating a zone where MBS transmission is to be performed in a second cell different from the first cell, and a controller configured to perform a predetermined operation to receive MBS data within the zone based on the system information, wherein the system information further comprises an identifier associated with the zone information, and the identifier corresponds to at least one selected from the group consisting of an identifier indicating the second cell, an identifier indicating a frequency to which the second cell belongs, and an identifier indicating an MBS session used for the MBS transmission to the zone.

* * * * *